United States Patent [19]
Beall et al.

[11] Patent Number: 5,492,869
[45] Date of Patent: Feb. 20, 1996

[54] COLORED, OPAQUE GLASS-CERAMIC

[75] Inventors: George H. Beall, Big Flats; Lina M. Echeverria, Erwin; Robert W. Pfitzenmaier, Canisteo, all of N.Y.

[73] Assignee: Corning Incorporated, Corning, N.Y.

[21] Appl. No.: 387,954

[22] Filed: Feb. 13, 1995

[51] Int. Cl.⁶ .................................................. C03C 10/12
[52] U.S. Cl. .................................................. 501/7; 501/68
[58] Field of Search .................................... 501/68, 69

[56]  References Cited

U.S. PATENT DOCUMENTS

| | | |
|---|---|---|
| 1,292,148 | 1/1919 | Taylor . |
| 2,920,971 | 1/1960 | Stookey . |
| 3,157,522 | 11/1964 | Stookey . |
| 3,788,865 | 1/1974 | Babcock et al. . |
| 4,461,839 | 7/1984 | Rittler . |
| 4,977,110 | 12/1990 | Amundson, Jr. et al. . |
| 5,070,045 | 12/1991 | Comte et al. . |
| 5,256,602 | 10/1993 | Danielson et al. . |

*Primary Examiner*—Karl Group
*Attorney, Agent, or Firm*—Milton M. Peterson

[57] ABSTRACT

An opaque glass-ceramic having a beta-spodumene solid solution as its primary crystal phase, and a method of controlling color in the glass-ceramic. The glass-ceramic is produced from a $Li_2O$-$Al_2O_3$-$SiO_2$ precursor glass containing 3–6% $TiO_2$+$ZrO_2$ as a nucleating agent and having colorants controlled at levels of 1500–4,000 ppm $Fe_2O_3$, 1500–4000 ppm $CeO_2$ and 50–500 ppm $V_2O_5$.

8 Claims, 1 Drawing Sheet

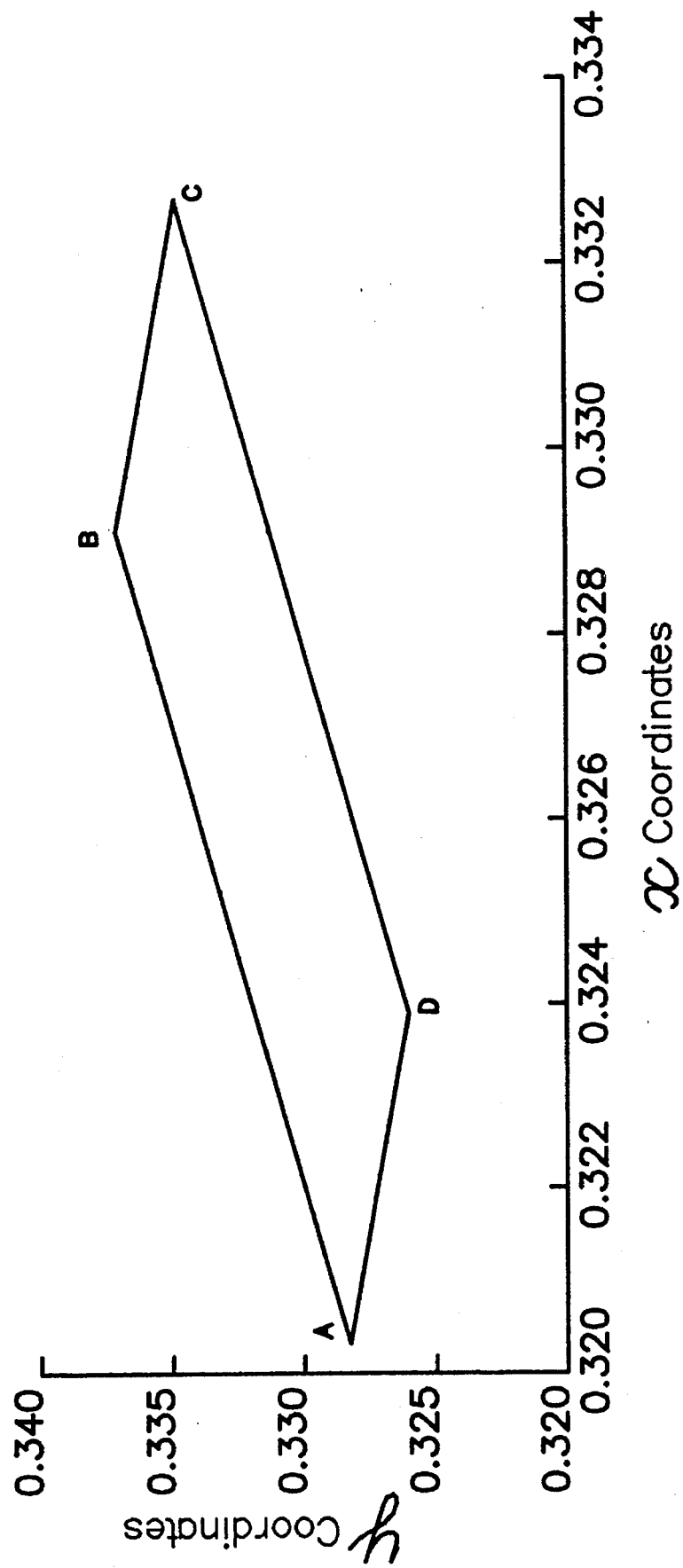

COLORED, OPAQUE GLASS-CERAMIC

FIELD OF THE INVENTION

The field is glass-ceramic materials and production of colors therein.

BACKGROUND OF THE INVENTION

A glass-ceramic is a material having at least one crystalline phase thermally developed in a uniform pattern throughout at least a portion of a glass precursor. Glass-ceramics have been known for over 30 years since being described in U.S. Pat. No. 2,920,971 (Stookey). They find application in diverse areas, an area of particular interest being the fabrication of articles used in the preparation and serving of food. Such articles include cookware, bakeware, tableware and flat cooktops.

In general, production of a glass-ceramic material involves three major steps:
1. Melting a mixture of raw materials, usually containing a nucleating agent, to produce a glass.
2. Forming an article from the glass and cooling the glass below its transformation range.
3. Crystallizing ("ceramming") the glass article by an appropriate thermal treatment.

The thermal treatment usually involves a nucleating step at a temperature slightly above the transformation range. This is followed by heating to a somewhat higher temperature to cause crystal growth on the nuclei.

Crystallization of glasses in the $Li_2O-Al_2O_3-SiO_2$ composition field generally provides highly crystallized glass-ceramics. The primary crystal phase depends on glass composition and heat treatment. It may be a transparent beta-quartz solid solution, or an opaque beta-spodumene solid solution.

Beta-quartz and beta-spodumene solid solution glass-ceramics customarily contain $TiO_2$ as a nucleating agent. Optionally, the $TiO_2$ may be partially, or wholly, substituted by $ZrO_2$. The appearance of such glass-ceramics can be varied by varying composition and/or heat treatment. Thus, transparent, translucent, or opaque glass-ceramics (which may be water-white, translucent, opaque white, or variously colored) are all possibilities as described in the prior art.

The widest use of $Li_2O-Al_2O_3-SiO_2$ glass-ceramic materials has been in the field of culinary ware. For over three decades, Corning Glass Works, now Corning Incorporated, has marketed opaque white cooking utensils under the trademark CORNING WARE. The $Li_2O-Al_2O_3-SiO_2$ glass-ceramic of this ware has a beta-spodumene crystal phase. In general, this opaque glass-ceramic is crystallized at high temperatures, which may reach 1150° C., to develop large, beta-spodumene solid solution crystals that render the article opaque.

U.S. Pat. No. 3,157,522 (Stookey) discloses a family of glasses that may be crystallized to produce glass-ceramics having an opaque, beta-spodumene crystal phase. This family consists essentially, in percent by weight calculated on an oxide basis, of 55–75% $SiO_2$, 3–6% $TiO_2$, 2–6.5% $Li_2O$ and 12–36% $Al_2O_3$, the weight ratio $LiO_2:Al_2O_3$ being 0.1 to 0.6 and the essential ingredients totaling at least 95%. It has subsequently been learned that $ZrO_2$ may replace $TiO_2$, at least in part, as a nucleating agent.

U.S. Pat. No. 5,070,045 (Comte et al.) discloses transparent, glass-ceramic plates wherein the predominant crystal phase in the glass-ceramics is beta-quartz solid solution. These plates use 0.1–1.0% of a colorant selected from CoO, NiO, $Cr_2O_3$, $Fe_2O_3$, $MnO_2$, and $V_2O_5$. The patent is primarily concerned with $V_2O_5$ which contributes to minimal distortion while giving a black aspect in reflection and a reddish brown tint in transmission. The Comte et al. compositions consist essentially, in weight percent, as calculated on the oxide basis, of:

| | | | |
|---|---|---|---|
| $SiO_2$ | 65–70 | $MgO + BaO + SrO$ | 1.1–2.3 |
| $Al_2O_3$ | 18–19.8 | $ZrO_2$ | 1.0–2.5 |
| $Li_2O$ | 2.5–3.8 | $As_2O_3$ | 0–1.5 |
| MgO | 0.55–1.5 | $Sb_2O_3$ | 0–1.5 |
| ZnO | 1.2–2.8 | $As_2O_3 + Sb_2O_3$ | 0.5–1.5 |
| $TiO_2$ | 1.8–3.2 | $Na_2O$ | 0–<1.0 |
| BaO | 0–1.4 | $K_2O$ | 0–<1.0 |
| SrO | 0–1.4 | $Na_2O + K_2O$ | 0–<1.0 |
| BaO + SrO | 0.4–1.4 | $\frac{2.8 Li_2O + 1.2 ZnO}{5.2 MgO}$ | >1.8 |

The Comte et al. base glasses have been found effective for use in producing both opaque and transparent, as well as colored and uncolored, glass-ceramic products from a single glass melting tank. In accomplishing this, a technique known as a forehearth coloring system, or colorcell, is employed.

Use of that technique makes it possible to obtain different colors, as well as the opaque product, with a single base glass composition for the precursor glass. That facilitates changing from one product to another with a single melting unit. It is also possible to melt one precursor base glass, and then make subsequent additions in the furnace forehearth to achieve different colors.

U.S. Pat. No. 4,977,110 (Amundson, Jr. et al.) discloses a family of glass-ceramic compositions within the broad scope of the Stookey patent. Those glass-ceramics are opaque, beige-tinted and have a $CeO_2$ content of 1.5–2.75% by weight. They provided acceptable colors, but a desire has arisen to soften or lighten the color. Also, it would be desirable to limit the use of $CeO_2$ which is relatively expensive and which, in such large amounts, gives rise to compatibility problems in color cell practice.

The present invention provides a color package that achieves both desired ends. In particular, it provides a soft beige color in beta-spodumene solid solution glass-ceramic ware.

SUMMARY OF THE INVENTION

The article of the invention is an opaque, $Li_2O-Al_2O_3-SiO_2$ glass-ceramic having a still beige color, having beta-spodumene as its primary crystal phase, having a color package comprising,

| | |
|---|---|
| $CeO_2$ | 1500–4000 ppm |
| $Fe_2O_3$ | 1500–4000 ppm |
| $V_2O_5$ | 50–500 ppm | and having a color defined by color coordinates, based on the CIE system (Illuminant C), within the ranges x=0.320014 0.3330, y=0.3265–0.3380 and Cap Y=40–70.

The invention further resides in a method of controlling a soft beige color in a glass-ceramic material having beta-spodumene solid solution as its predominant crystal phase, the method comprising controlling the $CeO_2$ level between 1500 ppm and 4000 ppm, the $Fe_2O_3$ level between 1500 and 4000 ppm, the $V_2O_5$ level between 50 and 500 ppm, and the $Co_3O_4$ level at not over 20 ppm.

PRIOR ART

In addition to the patents mentioned in the Background section, attention is also directed to United States patents described in an accompanying document.

BRIEF DESCRIPTION OF THE DRAWING

The single FIGURE in the accompanying drawing is a graphical representation of chromaticity coordinates x and y (Illuminant C). The FIGURE further shows a color coordinate box defining the color achieved in accordance with the invention.

DESCRIPTION OF THE INVENTION

Our invention is based in large measure on our discovery that a controlled soft beige color can be imparted to an opaque, beta-spodumene solid solution glass-ceramic. The precursor glass for a beta-spodumene glass-ceramic has a lithia aluminosilicate ($Li_2O$-$Al_2O_3$-$SiO_2$) base composition. Composition ranges for suitable lithia aluminosilicate glasses are set forth in Stookey U.S. Pat. No. 3,157,522, as indicated earlier.

The presence of lithia ($Li_2O$) and alumina ($Al_2O_3$), as well as silica ($SiO_2$), are essential in the precursor glass composition. These oxides produce the beta-spodumene crystal phase when the precursor glass is converted to a glass-ceramic (cerammed). Together with a nucleating agent, they will total at least about 95% of the precursor glass composition.

Iron oxide is normally present as an impurity in batch materials, particularly sand. It facilitates infra-red transmission, thereby providing retention and transfer of heat during glass melting. However, for present colorant purposes, the normal $Fe_2O_3$ content must be augmented. Accordingly, a level of 1500–4000 ppm, preferably about 2000 ppm, is maintained in the glass composition.

In addition to $Fe_2O_3$, the oxides of cerium ($CeO_2$) and vanadium ($V_2O_5$) are employed as members of the invention color package. $CeO_2$ is employed in an amount between 1500 and 4000 ppm, equivalent to 0.15 to 0.40% by weight. This is in contrast to the 1.5–2.75% required with that oxide alone in the Amundson, Jr. et al: patent.

$V_2O_5$ has proven to be a key factor in obtaining the desired color. Increasing the $V_2O_5$ content, with constant iron and cerium oxide contents, creates a positive effect on the color of the cerammed product.

Cerium oxide alone, as indicated earlier, is expensive. Further, it failed to provide a desired soft color at the high ceramming temperature employed for an opaque product. The addition of $V_2O_5$ had a positive, but insufficient, effect on color. More important, it failed to reduce cost. Consequently, it became necessary to resort to a three component system to achieve the dual features of color and cost reduction.

Iron alone, in sufficient amount, or in conjunction with $V_2O_5$, moves toward the desired color. However, the colorant tends to concentrate at the surface of an article. This creates undesirable color effects.

The Stookey patent prescribes up to 6% $TiO_2$ as a nucleating agent. It has since been learned that $ZrO_2$ can also function as a nucleating agent, and that a mixture of $TiO_2$ and $ZrO_2$ provides improved nucleation. Accordingly, it is customary to employ both oxides in an amount totaling 3–6%. However, $TiO_2$ tends to impart color to the glass while $ZrO_2$ is difficult to melt. Therefore, it is desirable to minimize the total content.

Cobalt oxide is frequently present from cullet used in the glass batch. Up to about 20 ppm can normally be tolerated without noticeable effect on ultimate product color. The glass may also include 0.1–1.5% of arsenic or antimony oxide as a fining agent. Minor amounts, up to a total of about 5%, of divalent metal oxides (MgO, CaO, ZnO) may be present as property modifiers. Alkali metal oxides, other than $Li_2O$, are usually avoided since they may form undesired crystal phases.

The present invention was developed employing a base glass in accordance with the teachings of the Comte et al. –045 patent. Accordingly, preferred base glasses have compositions falling within the ranges of that patent as set forth earlier. The color package added to these base glasses consists of:

1500–4000 ppm $CeO_2$
1500–4000 ppm $Fe_2O_3$
50–500 ppm $V_2O_5$.

This color package provides colors generally defined by the following color coordinate ranges in accordance with the C.I.E. system.

x=0.3200 to 0.3330
y=0.3265 to 0.3380
Y=40 to 70

The colorants may be introduced by incorporating suitable sources in the batch fed to a melting unit. However, a real advantage is obtained by using a forehearth colorant additive system sometimes referred to as a colorcell.

The method and equipment used to add a colorant material to molten glass in a forehearth are collectively referred to as a forehearth coloring system, or a colorcell. Such systems (colorcells) have been in use for at least 30 years. They have been used primarily to impart colors to soda lime glasses, in particular, green or blue colors to soda lime glass bottles. Currently, colorcells are employed to introduce two types of glass colorants: unmelted concentrated colorant in particulate form and melted color frits. The former is favored in the United States, while the latter is more popular in Europe.

The glass product thus produced is then cerammed. This involves heat treating to produce the desired glass-ceramic product by uniform, in situ crystallization of the glass. A typical schedule for the present beta-spodumene, colored product is:

1. Raise furnace temperature to 800° C. at 300° C./hour.
2. Hold between 800° C. and 850° C. for 30 minutes.
3. Raise to 1140°–1150° C. at 300° C./hour.
4. Hold for 45–60 minutes.
5. Cool at furnace rate to ambient.

In studying the effects of the color package in beta-spodumene glass-ceramics, the following commercial base glass composition, as calculated in weight percent on an oxide basis was employed:

| | | | |
|---|---|---|---|
| $SiO_2$ | 68.4 | $TiO_2$ | 2.6 |
| $Al_2O_3$ | 19.5 | $ZrO_2$ | 1.7 |
| $Li_2O$ | 3.5 | $As_2O_3$ | 0.6 |
| MgO | 1.2 | $Fe_2O_3$ | 900 ppm |
| ZnO | 1.6 | $Co_3O_4$ | 20 ppm |
| BaO | 0.8 | | |

Initially, a series of six crucible melts was made. The batch for each melt was derived from the base glass plus an addition of colorants in increments. $Fe_2O_3$ and $CeO_2$ contents were varied from 2000 to 3000 parts per million (ppm) while $V_2O_5$ was varied from 200–300 ppm.

That series of batch melts provided cerammed colors approaching the desired color. Accordingly, three further series of crucible melts were designed. In each series, $Fe_2O_3$ and $CeO_2$ content levels were held constant while $V_2O_5$ was varied from 0 to 300 ppm. $Fe_2O_3$ and $CeO_2$ levels were 2000 ppm each in one series; 2400 ppm each in a second series; and 3000 ppm each in the third.

Batches were formulated and mixed employing standard glass-making materials. These included spodumene, as a source of $Li_2O$, $Al_2O_3$ and $SiO_2$, and oxides, or other compounds which upon melting convert to the oxide. The colorants were added as oxides.

Each batch weighed 1000 grams and was melted in a platinum crucible for 16 hours at 1650° C. A single patty was poured from each melt. The patties were cerammed in gas-fired, production tunnel kilns for determination of color properties.

TABLES I, II and III illustrate the effect on color when the $V_2O_5$ content in ppm is varied at constant $CeO_2$ and $Fe_2O_3$ levels. Color properties are set forth in terms of x and y coordinates in accordance with the CIE system. The color packages in TABLE I all have constant levels of 2000 ppm each of $CeO_2$ and $Fe_2O_3$. In TABLE II, the $CeO_2$ and $Fe_2O_3$ levels are at 2400 ppm; in TABLE III, the levels are 3000 ppm. Thus, variations in $CeO_2$ and $Fe_2O_3$ levels are illustrated as well.

Each mix was sintered and broken up to provide a mean particle size on the order of 3.2–12.7 mm (⅛–½"). The particulate materials were fed into a forehearth through feed systems at different rates. Rate targets were a low level of 2000 ppm each of $CeO_2$ and $Fe_2O_3$ in the glass, and a high level of 3000 ppm of each oxide in the glass.

$V_2O_5$ was supplied separately as a bonded oxide prepared in accordance with U.S. Pat. No. 5,256,602 (Danielson et al.). The material was composed essentially of 36.3 $SiO_2$, 6.4 $B_2O_3$, 11 $Na_2O$, and 39 $V_2O_5$, all in pans by weight. It was added through a second and separate feed system on the forehearth. This frit was designed to be added at rates intended to provide levels of 150 and 300 ppm $V_2O_5$ in the glass. Thus, by combining the additions properly, four levels were targeted.

Samples were taken periodically for color and colorant measurements. Colorant oxide contents were measured by x-ray fluorescence. Color coordinates were measured by standard optical procedures. Measurements were made at three different locations on each sample and the results averaged to provide representative values.

TABLE IV below shows representative average measurements made on samples during the run. It will be appreciated that, during a transition, composition targets are, at best, only approximated. However, the actual compositions provide a basis for comparison and selection. For example, during the run, a shift was made to a third $CeO_2/Fe_2O_3$ additive in which the $CeO_2$ level was 3000 ppm

TABLE I

| $V_2O_5$ | 300 | 250 | 200 | 150 | 100 | 50 | 0 |
| --- | --- | --- | --- | --- | --- | --- | --- |
| Y | 55.91 | 57.16 | 58.65 | 60.42 | 62.71 | 65.46 | 68.44 |
| x | 0.3280 | 0.3271 | 0.3256 | 0.3253 | 0.3243 | 0.3222 | 0.3214 |
| y | 0.3320 | 0.3313 | 0.3301 | 0.3300 | 0.3296 | 0.3278 | 0.3275 |

TABLE II

| $V_2O_5$ | 240 | 200 | 150 | 100 | 50 | 0 |
| --- | --- | --- | --- | --- | --- | --- |
| y | 59.26 | 59.05 | 61.24 | 63.05 | 66.23 | 69.13 |
| x | 0.3256 | 0.3250 | 0.3245 | 0.3243 | 0.3219 | 0.3204 |
| y | 0.3304 | 0.3295 | 0.3298 | 0.3304 | 0.3283 | 0.3280 |

TABLE III

| $V_2O_5$ | 300 | 250 | 200 | 150 | 100 | 50 |
| --- | --- | --- | --- | --- | --- | --- |
| Y | 54.52 | 55.81 | 56.59 | 58.50 | 59.95 | 62.36 |
| x | 0.3310 | 0.3300 | 0.3297 | 0.3283 | 0.3266 | 0.3253 |
| y | 0.3365 | 0.3357 | 0.3355 | 0.3347 | 0.3331 | 0.3320 |

Based on these melts, a trial was scheduled in a commercial melting unit. This unit had a forehearth equipped to make colorcell additions of bonded oxides adapted to provide the $CeO_2$, $Fe_2O_3$ and $V_2O_3$ colorants. Additions were varied to provide a range of colors.

Cerium oxide and iron oxide were mixed in batches added separately as single or individual bonded oxides. This permitted varying the individual amounts of each colorant, as well as their relative amounts. In actual production, a single bonded oxide material, available from Ferro Corporation under the designation LU-436-F, would be employed as a source of $CeO_2$ and $Fe_2O_3$.

and the $Fe_2O_3$ level was 2000 ppm. Examples 5 and 6 in TABLE IV represent this latter condition.

TABLE IV

| Ex. | $CeO_2$ | $Fe_2O_3$ | $V_2O_5$ | Y | x | y |
| --- | --- | --- | --- | --- | --- | --- |
| 1 | 1946 | 1680 | 140 | 64.6 | 0.3229 | 0.3278 |
| 2 | 2141 | 1825 | 280 | 59.3 | 0.3261 | 0.3300 |
| 3 | 2515 | 2486 | 280 | 58.2 | 0.3293 | 0.3346 |
| 4 | 2804 | 2706 | 170 | 61.3 | 0.3294 | 0.3357 |
| 5 | 2866 | 1955 | 200 | 61.4 | 0.3256 | 0.3306 |
| 6 | 2834 | 1763 | 260 | 60.0 | 0.3247 | 0.3288 |

The single FIGURE in the accompanying drawing employs the CIE chromaticity coordinate system based on x and y coordinates to graphically represent the invention. x coordinates are plotted on the horizontal axis and y coordinates on the vertical axis. The rectangle ABCDA encompasses coordinate value combinations that provide generally acceptable colors in accordance with the invention. The color coordinate value ranges for this area are:

x=0.3200–0.3330
y=0.3265–0.3380

The x and y coordinate values for the points on the rectangle ABCDA are:

|   | x | y |
|---|---|---|
| A | 0.3206 | 0.3288 |
| B | 0.3295 | 0.3379 |
| C | 0.3328 | 0.3355 |
| D | 0.3238 | 0.3265 |

The presently preferred embodiment of the invention is a beta-spodumene glass-ceramic having the commercial base composition described earlier, and having a color package consisting of 2000 ppm each of $CeO_2$ and $Fe_2O_3$ and 300 ppm $V_2O_5$.

We claim:

1. An opaque, $Li_2O$-$Al_2O_3$-$SiO_2$ glass-ceramic having a soft beige color, having beta-spodumene as its primary crystal phase, having a color package comprising, $CeO_2$ 1500–4000 ppm, $Fe_2O_3$ 1500–4000 ppm, $V_2O_5$ 50–500 ppm, having a color defined by color coordinate ranges, based on the CIE system (Illuminant C), of x=0.3200–0.3330, y=0.3265–0.3380 and Y=40–70.

2. A glass-ceramic in accordance with claim 1 wherein the glass-ceramic consists essentially of, as calculated in weight percent on an oxide basis:

| $SiO_2$ | 55–75% |
|---|---|
| $Al_2O_3$ | 12–36% |
| $Li_2O$ | 2–6.5% |
| $TiO_2 + ZrO_2$ | 3–6% |
| $Li_2O:Al_2O_3$ | 0.1–0.6 | as essential ingredients totaling at least 95%.

3. A glass-ceramic in accordance with claim 1 wherein the glass-ceramic consists essentially of, as calculated in weight percent on an oxide basis:

| $SiO_2$ | 65–70 | SrO | 0–1.4 |
|---|---|---|---|
| $Al_2O_3$ | 18–19.8 | BaO + SrO | 0.4–1.4 |
| $Li_2O$ | 2.5–3.8 | $As_2O_3$ | 0–1.5 |
| MgO | 0.5–1.5 | $Sb_2O_3$ | 0–1.5 |
| ZnO | 1.2–2.8 | $As_2O_3 + Sb_2O_3$ | 0.5–1.5 |
| $TiO_2$ | 1.8–3.2 | $Na_2O + K_2O$ | 0–<1.0 |
| $ZrO_2$ | 1.0–2.5 | $CeO_2$ | 1500–4000 ppm |
| BaO | 0–1.4 | $Fe_2O_3$ | 1500–4000 ppm |
|  |  | $V_2O_5$ | 50–500 ppm |
|  |  | $Co_3O_4$ | 0–20 ppm |

4. A glass-ceramic in accordance with claim 3 consisting of, as calculated in approximate weight percent on an oxide basis:

| $SiO_2$ | 68.4 | $ZrO_2$ | 1.7 |
|---|---|---|---|
| $Al_2O_3$ | 19.5 | BaO | 0.8 |
| $Li_2O$ | 3.5 | $As_2O_3$ | 0.6 |
| MgO | 1.2 | $Fe_2O_3$ | 2000 ppm |
| ZnO | 1.6 | $CeO_2$ | 2000 ppm |
| $TiO_2$ | 2.6 | $V_2O_5$ | 300 ppm |

5. A method of controlling color in a glass-ceramic material having beta-spodumene solid solution as its predominant crystal phase, the method comprising adding a color package composed of $CeO_2$ between 1500 ppm and 4000 ppm, $Fe_2O_3$ between 1500 and 4000 ppm, $V_2O_5$ between 50–500 ppm and $Co_3O_4$ not over about 20 ppm to a precursor glass, and forming said glass-ceramic material.

6. A method in accordance with claim 5 wherein said precursor glass has a base composition consisting essentially of, as calculated on an oxide basis in weight percent:

| $SiO_2$ | 55–75% |
|---|---|
| $Al_2O_3$ | 12–36% |
| $Li_2O$ | 2–6.5% |
| $TiO_2 + ZrO_3$ | 3–6% |
| $Li_2O:Al_2O_3$ | 0.1–0.6 | as essential ingredients totaling at least 95%.

7. A method in accordance with claim 6 which comprises heating the precursor glass to a temperature of about 800° C., holding at 800°–850° C., heating to 1140°–1150° C. and holding at that temperature to develop a beta-spodumene crystal phase having a soft beige color.

8. A method in accordance with claim 6 which comprises adding at least a portion of the color package to the precursor glass as it passes through a forehearth.

* * * * *